(12) United States Patent
Favaretto

(10) Patent No.: US 12,128,955 B2
(45) Date of Patent: Oct. 29, 2024

(54) CAR WITH WHEEL FAIRING

(71) Applicant: FERRARI S.p.A., Modena (IT)

(72) Inventor: Fabrizio Favaretto, Formigine (IT)

(73) Assignee: FERRARI S.P.A., Modena (IT)

( * ) Notice: Subject to any disclaimer, the term of this patent is extended or adjusted under 35 U.S.C. 154(b) by 131 days.

(21) Appl. No.: 17/614,586

(22) PCT Filed: Dec. 4, 2020

(86) PCT No.: PCT/IB2020/061516
§ 371 (c)(1),
(2) Date: Nov. 29, 2021

(87) PCT Pub. No.: WO2021/111402
PCT Pub. Date: Jun. 10, 2021

(65) Prior Publication Data
US 2022/0289305 A1    Sep. 15, 2022

(30) Foreign Application Priority Data
Dec. 5, 2019    (IT) .......................... 102019000023112

(51) Int. Cl.
*B62D 35/00*    (2006.01)
*B62D 25/18*    (2006.01)

(52) U.S. Cl.
CPC ........... *B62D 25/186* (2013.01); *B62D 35/00* (2013.01)

(58) Field of Classification Search
CPC .... B62D 25/186; B62D 37/02; B62D 25/182; B62D 35/008; B62D 35/00; B62D 25/161; B62D 25/00; Y10T 74/20; B60Q 1/326

(Continued)

(56) References Cited

U.S. PATENT DOCUMENTS

| | | | | |
|---|---|---|---|---|
| 5,820,203 A | * | 10/1998 | Morelli | ................. B62D 35/02 296/180.1 |
| 8,260,519 B2 | * | 9/2012 | Canfield | ................ B62D 35/00 701/74 |

(Continued)

FOREIGN PATENT DOCUMENTS

CN    102236225 A    11/2011

OTHER PUBLICATIONS

International Search Report and Written Opinion for Application No. PCT/IB2020/061516 mailed Apr. 1, 2021, 13 pages.

(Continued)

*Primary Examiner* — James A Shriver, II
*Assistant Examiner* — Hilary L Johns
(74) *Attorney, Agent, or Firm* — CANTOR COLBURN LLP

(57) ABSTRACT

A car having: two front wheels; two rear wheels; a body, which has two front wheel compartments, each housing, on the inside, a corresponding front wheel, and two rear wheel compartments, each housing, on the inside, a corresponding rear wheel; and two covering panels, each arranged in the area of a corresponding wheel compartment to close the wheel compartment. Each covering panel is mounted on the body so as to be movable between a contracted position, in which the covering panel is completely flush with the body, and an expanded position, in which the covering panel is at least partially spaced apart from the body. Two actuator devices are provided, each coupled to a corresponding covering panel so as to move the covering panel between the contracted position and the expanded position.

19 Claims, 6 Drawing Sheets

(58) Field of Classification Search
USPC .......................................................... 280/848
See application file for complete search history.

(56) References Cited

U.S. PATENT DOCUMENTS

| | | | | |
|---|---|---|---|---|
| 10,953,928 | B2* | 3/2021 | Angelo | B62D 9/00 |
| 2010/0219661 | A1* | 9/2010 | Butlin, Jr. | B62D 35/005 |
| | | | | 296/180.1 |
| 2011/0080019 | A1* | 4/2011 | Castillo | B62D 25/16 |
| | | | | 296/180.1 |
| 2012/0013113 | A1* | 1/2012 | Trenne | B62D 25/182 |
| | | | | 280/849 |
| 2013/0096781 | A1* | 4/2013 | Reichenbach | B60Q 1/326 |
| | | | | 280/849 |
| 2015/0274221 | A1* | 10/2015 | Hoelzel | B62D 35/005 |
| | | | | 296/180.1 |
| 2019/0009831 | A1* | 1/2019 | Albertson | B62D 35/008 |
| 2019/0210657 | A1* | 7/2019 | Gandhi | B62D 37/02 |
| 2019/0300069 | A1* | 10/2019 | Angelo | B62D 35/001 |

OTHER PUBLICATIONS

Second Office Action in Chinese Patent Application No. 202080039206. 9, Date of Mailing Dec. 21, 2023, 6 pages.

\* cited by examiner

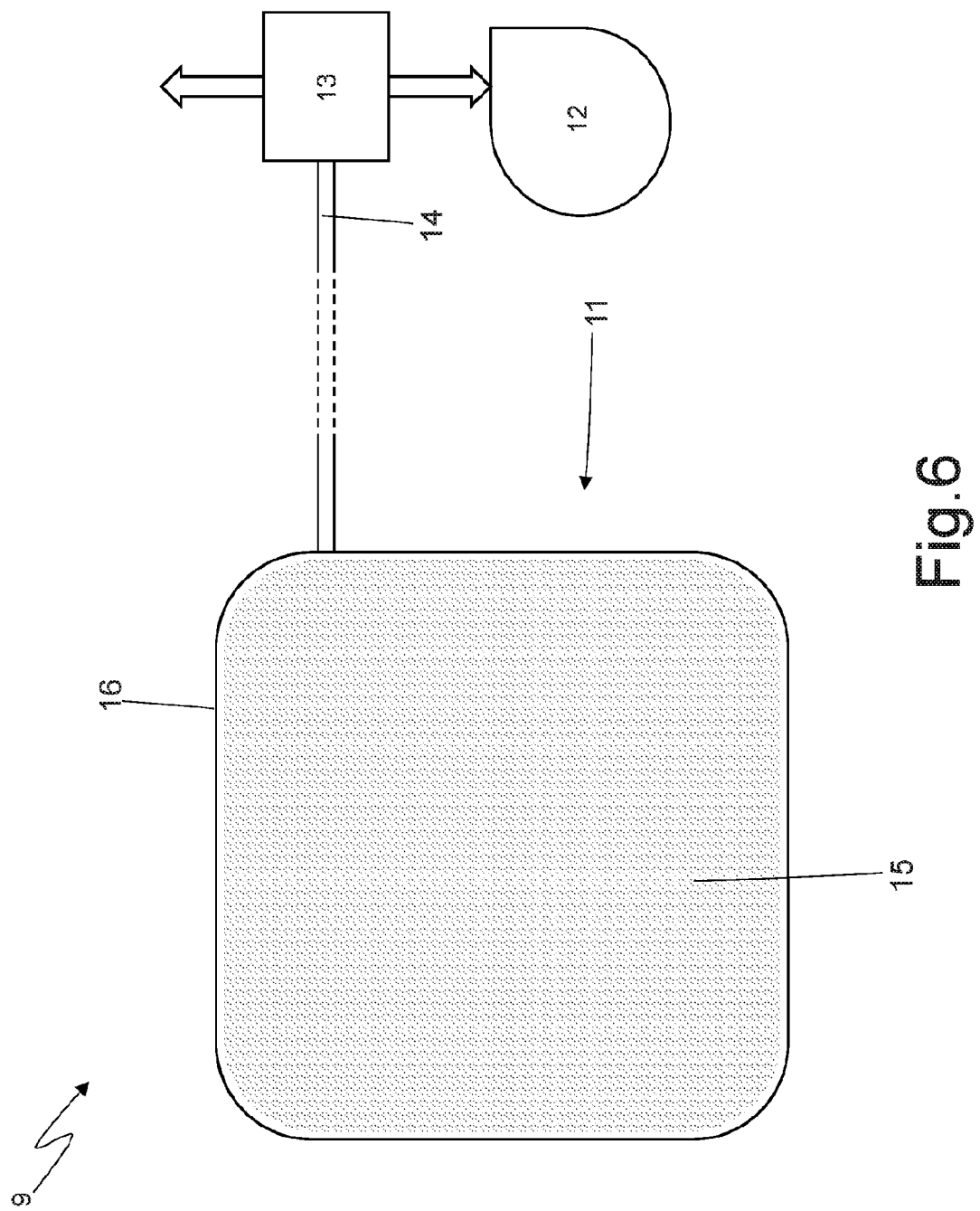

CAR WITH WHEEL FAIRING

CROSS-REFERENCE TO RELATED APPLICATIONS

This patent application claims priority from Italian patent application no. 102019000023112 filed on May 12, 2019, the entire disclosure of which is incorporated herein by reference.

TECHNICAL FIELD

The invention relates to a car with wheel fairing.

PRIOR ART

At a high speed (namely, when driving on a motorway), the greatest part of the energy absorbed by a car is due to the need to overcome aerodynamic resistance; as a consequence, in order to reduce consumptions (of fuel or electrical power) and, hence, increase the autonomy (with the same quantity of fuel or electrical power stored when the car is started), the aerodynamic resistance of the car needs to be reduced.

In order to reduce the aerodynamic resistance of a car, it is useful to close the wheel compartments (like, for example, in U.S. Pat. No. 2,128,686A) so that the rotation of the wheels does not interfere with the air flows brushing the body on the sides. However, while closing the rear wheel compartments with respective removable covering panels (so that the tyres can be replaced) does not lead to negative consequences, closing the front wheel compartments with respective removable covering panels (so that the tyres can be replaced) has, on the contrary, negative consequences, as it involves significantly reducing the front axle track (i.e. the distance between the outer sides of the front wheels). In other words, the front wheels need to be able to pivot in order to allow the car to steer (the front wheels normally have a size that projects out of the outer profile of the car while steering) and, hence, the front wheels need to be properly spaced apart from the respective covering panels (thus reducing, as a consequence, the front axle track) in order to ensure the space required by the pivoting of the front wheels; however, the reduction of the front axle track significantly affects the dynamic performances of the car and reduces the space available in the front trunk.

Patent applications US2019210657A1, US2013096781A1 and US2012013113A1 disclose a car having a fairing of the front wheel compartments by means of respective covering panels, which are movable so as to expand outwards when the front wheels need to be steered.

DESCRIPTION OF THE INVENTION

The object of the invention is to provide a car with front wheel fairing, which has a reduced aerodynamic resistance without being affected, at the same time, in terms of dynamic performances and of space available in the front trunk.

According to the invention, there is provided a car with front wheel fairing according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein:

FIG. 6 is a schematic view of a pneumatic actuator used by the car of FIG. 1.

PREFERRED EMBODIMENTS OF THE INVENTION

Figure 1:
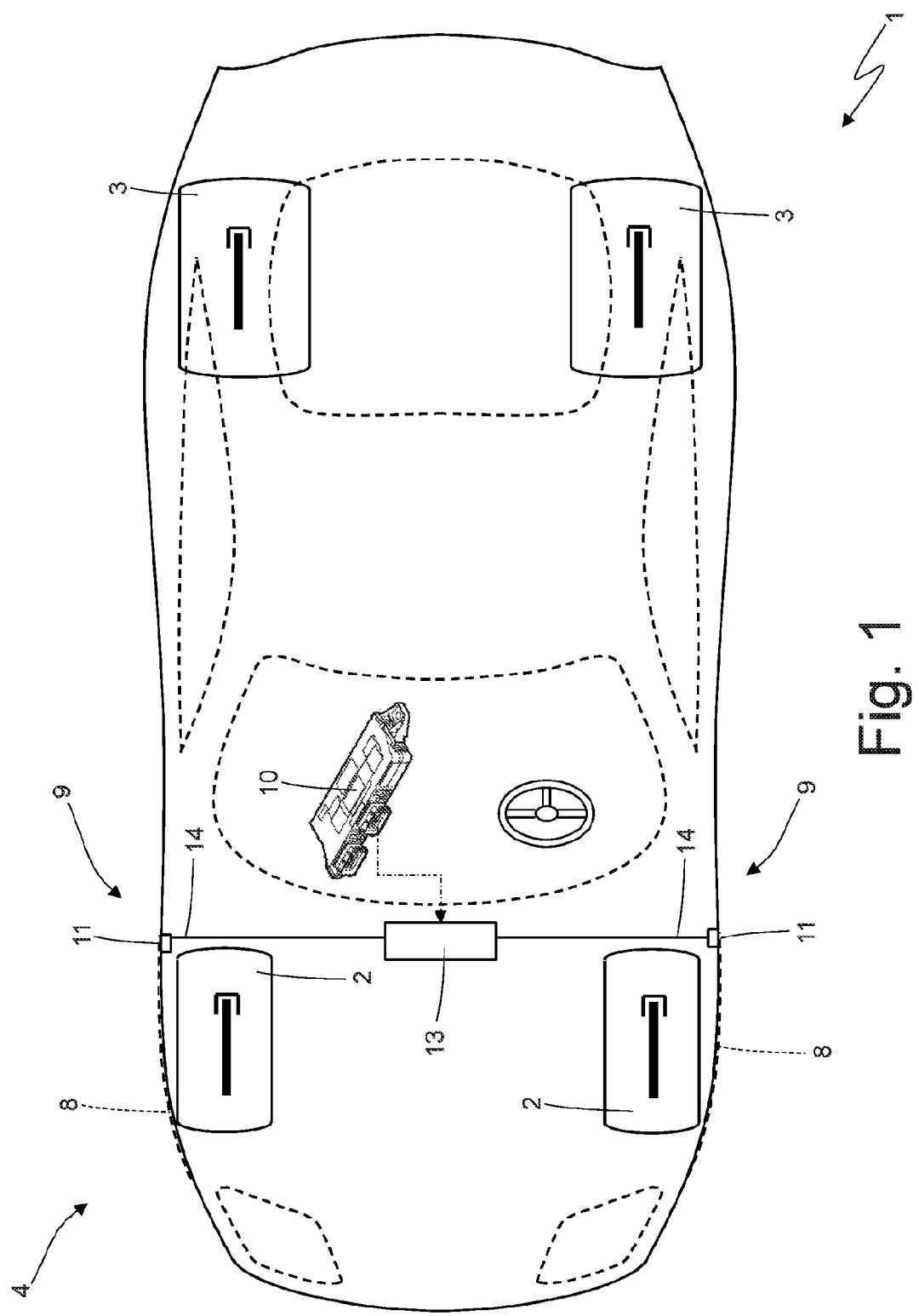
FIG. 1 is a schematic plan view of a car provided with front wheel fairing according to the invention.

In FIG. 1, number 1 indicates, as a whole, a car.

The car 1 comprises a frame supporting two front wheels 2 (driven wheels) and two rear wheels 3 (drive wheels); according to alternative embodiments, the front wheels 2 could be drive wheels as well (in addition to the rear wheels 3) or the sole front wheels 2 could be drive wheels (alternatively to the rear wheels 3). The frame is covered by a body 4, which defines a passenger compartment arranged between the front wheels 2 and the rear wheels 3; the passenger compartment is provided with two or more seats, each designed to accommodate a respective passenger. The front wheels 2 are steering wheels, namely are mounted so as to pivot around respective vertical pivot axes in order to change their steering angle (and, hence, allow the car 1 to change direction), as show for example in FIGS. 2 (where the steering angle is small) and 3 (where the steering angle is greater). The rear wheels 3 are not steering wheels, namely they always have a zero steering angle.

In a front position there is an internal combustion engine, which produces a torque, which is transmitted to the rear wheels 3 (drive wheels) by means of a drivetrain.

According to FIG. 6, in the area of the two front wheels 2, the body 4 has two front wheel compartments 5, each housing, on the inside, a corresponding front wheel 2; similarly, in the area of the two rear wheels 3, the body 4 has two rear wheel compartments 6, each housing, on the inside, a correspond rear wheel 3.

Figure 5:
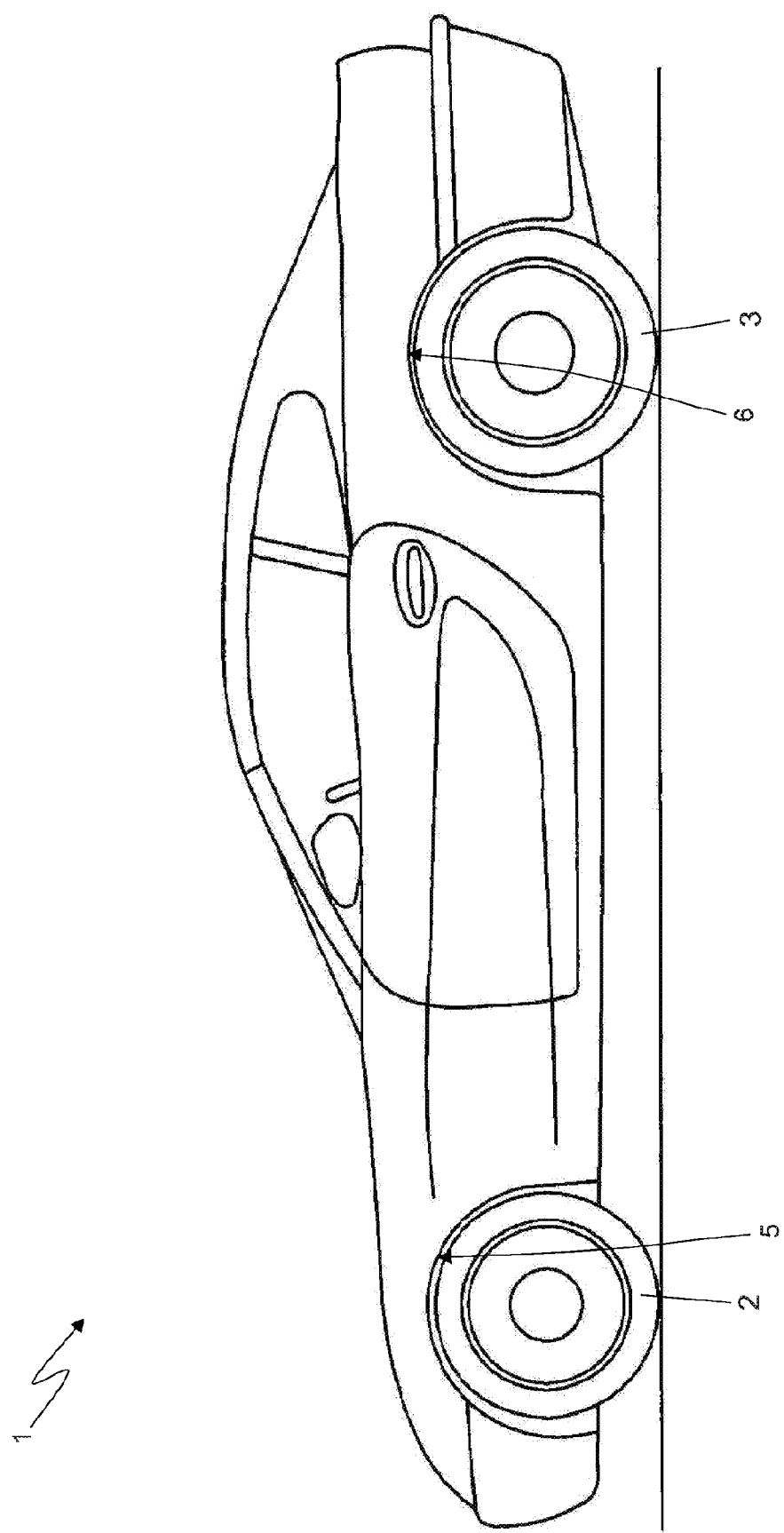
FIG. 5 is a schematic side view of the car of FIG. 1 without the covers of the wheel compartments.

According to FIG. 5, there are provided two rear covering panels 7 (only one of them being shown in FIG. 5), which are mounted flush with the body 4 in the area of the rear wheel compartments 6 in order to close (cover) the rear wheel compartments 6. In other words, each rear covering panel 7 is flush with the body 4 so as to close (cover, fair) the outer side of a respective rear wheel compartment 6. Obviously, each rear covering panel 7 is (easily) removable in order to allow access to the corresponding rear wheel 3 when the tyre needs to be replaced or subjected to maintenance. According to a preferred embodiment, the two rear covering panels 7 are rigid, namely they are not deformable (for example, they are made of aluminium, of a plastic material or of a composite material), and are fixed to the body 4 so as not to make, in use, any movement relative to the body 4.

According to FIG. 5, there are provided two front covering panels 8 (only one of them being shown in FIG. 5), which are normally mounted flush with the body 4 in the area of the front wheel compartments 5 in order to close (cover, fair) the front wheel compartments 5. In other words, each front covering panel 8 normally is flush with the body 4 so as to close (cover, fair) the outer side of a respective front wheel compartment 5. Obviously, each front covering panel 8 is (easily) removable in order to allow access to the corresponding front wheel 2 when the tyre needs to be replaced or subjected to maintenance.

Figure 2:
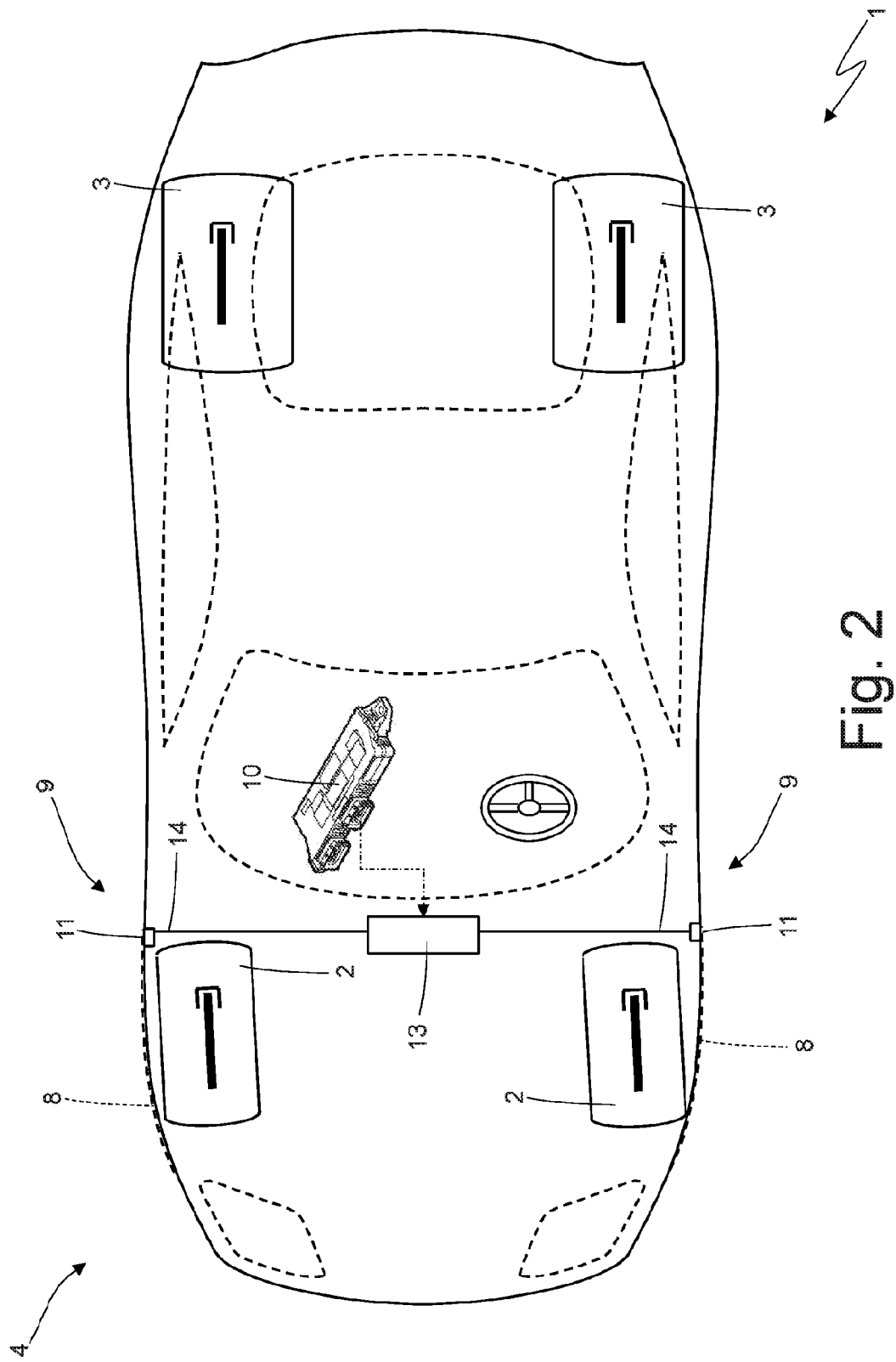
FIG. 2 is a schematic plan view of the car of FIG. 1 with the front wheels slightly steered to the left.
Figure 3:
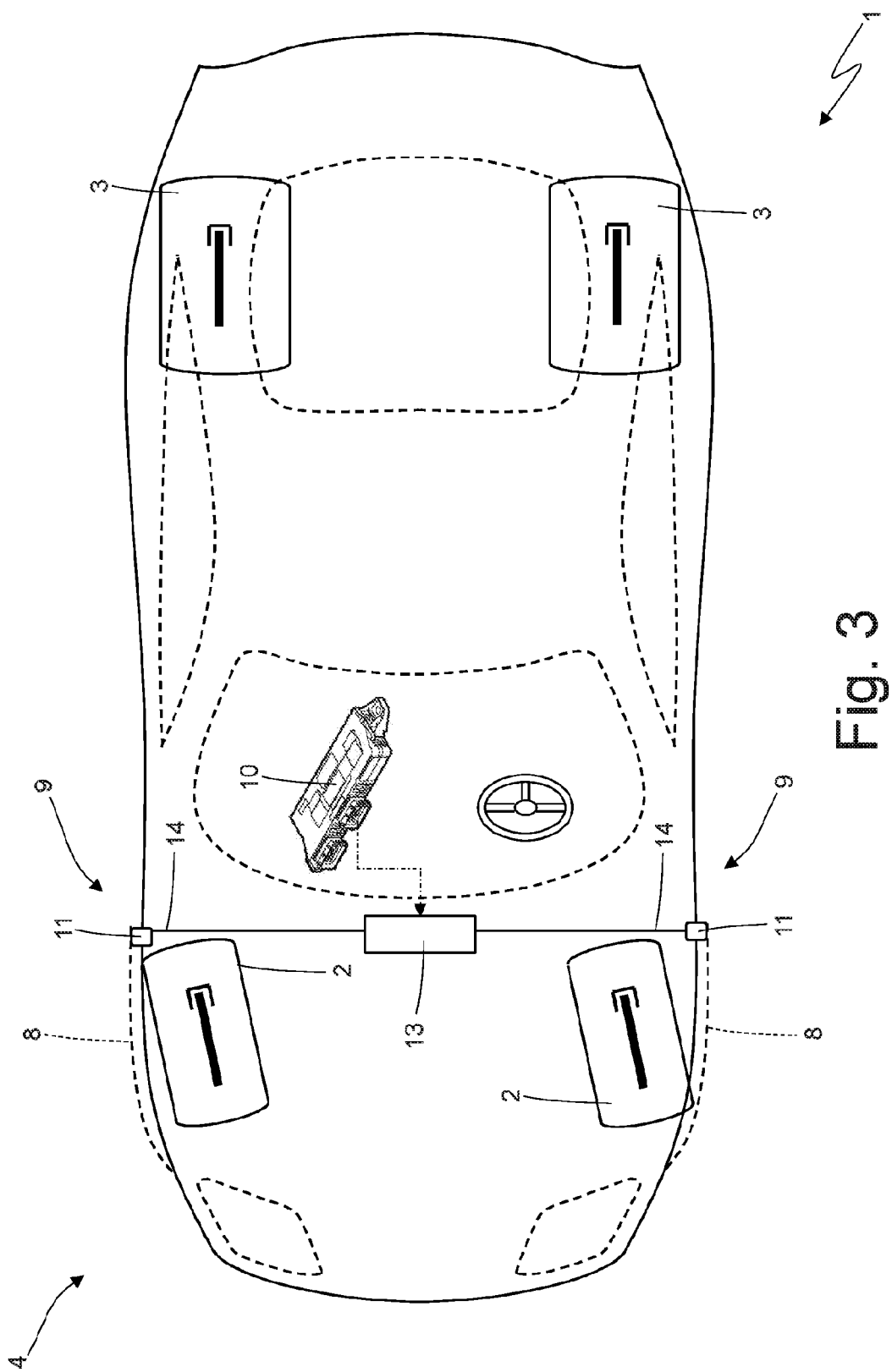
FIG. 3 is a schematic plan view of the car of FIG. 1 with the front wheels greatly steered to the left.
Figure 4:
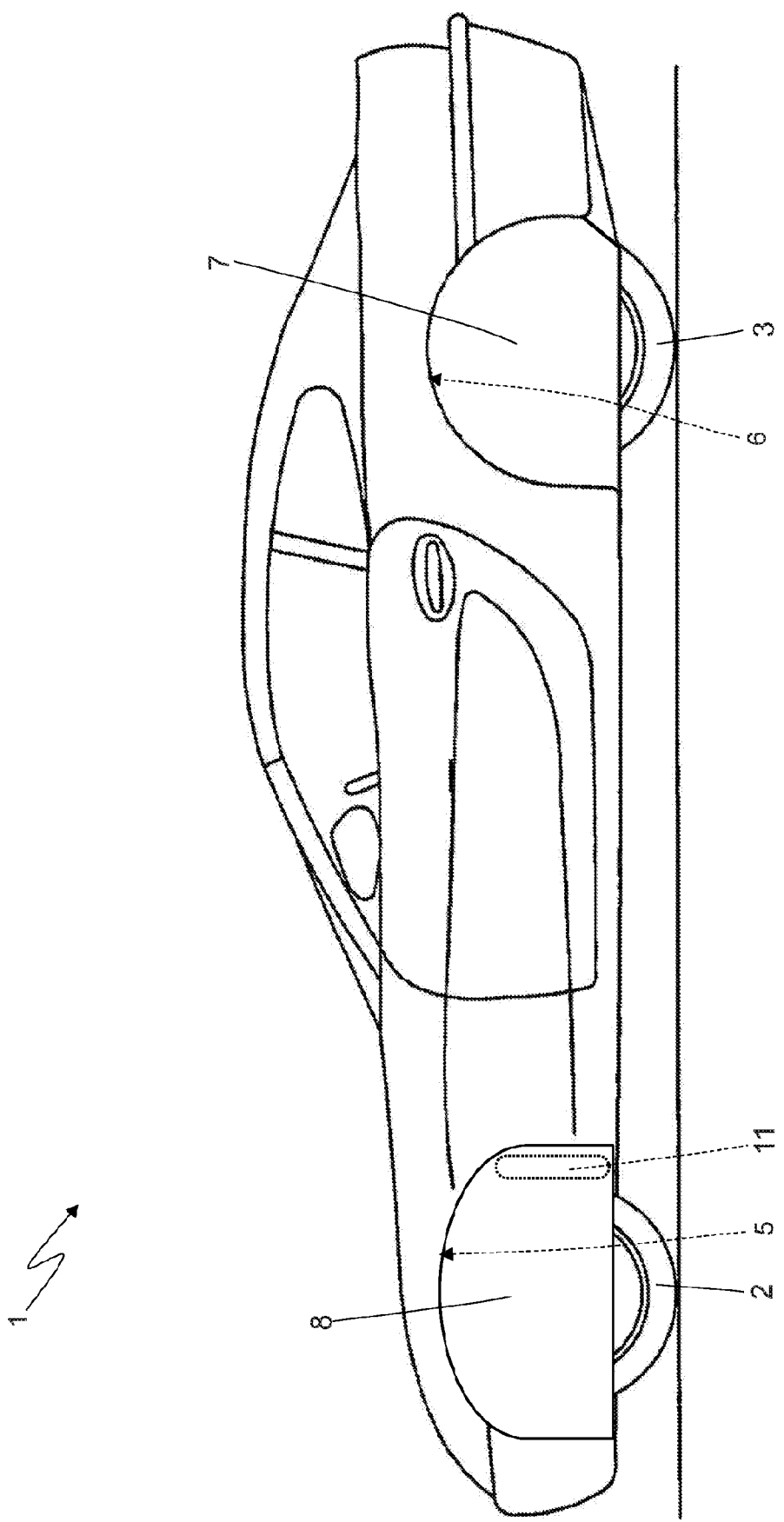
FIG. 4 is a schematic side view of the car of FIG. 1 with the covers of the wheel compartments in place.

According to FIGS. 1, 2 and 3, each front covering panel 8 is mounted on the body 4 so as to be movable between a contracted position (shown in FIGS. 1 and 2), in which the front covering panel 8 is completely flush with the body 4, and an expanded position (shown in FIG. 3), in which the front covering panel 8 is at least partially spaced apart from the body 4. Two actuator devices 9 are provided, each coupled to a corresponding front covering panel 8 so as to move the front covering panel 8 between the contracted position (shown in FIGS. 1 and 2) and the expanded position (shown in FIG. 3).

In other words, the front covering panels 8 move outwards (from the contracted position to the expanded position) in order to allow the front wheels 2 to steer.

According to FIGS. 1, 2 and 3, there is provided a control unit 10, which is configured to detect a steering angle of the front wheels 2 and to move the front covering panels 8 between the contracted position and the expanded position depending on the steering angle of the front wheels 2. In particular, the control unit 10 is configured to move the front covering panels 8 from the contracted position to the expanded position when the steering angle of the front wheels 2 exceeds a first threshold value and to move the front covering panels 8 from the expanded position to the contracted position when the steering angle of the front wheels 2 is smaller than a first threshold value; obviously, the control unit 10 applies a given degree of hysteresis (even time-wise) to the first threshold value in order to avoid activations that are too close together.

The first threshold value preferably is small but not equal to zero (for example, it is 2-5°), namely the first threshold value is greater than 0°. Indeed, according to FIG. 2, the front wheels 2 are capable of assuming small steering angles (namely, steering angles that are smaller than the first threshold value) without hitting the front covering panels 8. Therefore, when the car 1 is driving at a relatively high speed, the trajectory followed by the car 1 can gradually be changed (by steering the front wheels 2 with small steering angles) without having to move the front covering panels 8 from the contacted position to the expanded position; in fact, when the car 1 is driving at a relatively high speed, drivers normally rotate the steering wheel only to impart small steering angles, so as not to make the car 1 unstable.

When the car 1 is a driving at a low speed (or is even standing still), drivers can also rotate the steering wheels to impart large steering angles (typically during parking operations) and, in this case, the front covering panels 8 always need to be moved from the contracted position to the expanded position.

According to a possible embodiment, the control unit 10 is configured to keep the front covering panels 8 in the expanded position for a given amount of time (for example 30-300 seconds) after the steering angle of the front wheels has exceeded the first threshold value, unless the longitudinal speed exceeds a second threshold value (for example 90-110 km/h). In other words, if the steering angle 2 exceeds the first threshold value, the control unit 10 moves the front covering panels 8 to the expanded position and keeps the front covering panels 8 in the expanded position until the end of a given amount of time (for example 30-300 seconds) or as long as the longitudinal speed does not exceed the second threshold value.

According to a preferred (though, non-limiting) embodiment, the control unit 10 is configured to always move both front covering panels 8 from the contracted position to the expanded position when the steering angle of the front wheels 2 exceeds the first threshold value (as shown in FIG. 3); indeed, whereas the front wheel 2 on the inside of the bend (the left front wheel 2 in FIG. 3) tends to get out of the front wheel compartment 5 at the front, the front wheel 2 on the outside of the bend (the right front wheel 2 in FIG. 3) tends to get out of the front wheel compartment 5 at the back.

According to a preferred (though, non-limiting) embodiment, each front covering panel 8 has a front portion, which is permanently connected to the body 4 (namely, is hinged to the body 4), and a rear portion, which is movable relative to the body 4; each actuator device 9 is coupled to the rear portion of the corresponding front covering panel 8 and is designed to move the rear portion away from or close to the body 4.

According to a preferred (though, non-limiting) embodiment, each front covering panel 8 is made of a deformable material; in particular, each front covering panel 8 is made of a textile material. According to an alternative embodiment, the two front covering panels 8 are rigid, namely they are not deformable (for example, they are made of aluminium, of a plastic material or of a composite material).

According to a preferred (though, non-limiting) embodiment, each actuator device 9 normally is expanded so as to place the front covering panel 8 in the expanded position in the absence of a power supply. In this way, in case of faults of the actuator device 9, the corresponding front covering panel 8 automatically places itself in the expanded position, which is the "safest" position (since it allows for the maximum steering angle of the front wheels 2).

According to a preferred (though, non-limiting) embodiment, each actuator device 9 is a pneumatic actuator device. In particular, according to FIG. 6, each actuator device 9 comprises a deformable body 11, which expands, increasing its size, when it is subjected to the atmospheric pressure and contracts, reducing its size, when it is subjected to a vacuum; furthermore, each actuator device 9 comprises a vacuum source 12, which is designed to generate a vacuum, and a pneumatic selector 13, which is designed to alternatively connect the deformable body 11 to the vacuum source 12 or the atmospheric pressure and is connected to the deformable body 11 by means of a duct 14.

According to a preferred (though, non-limiting) embodiment, each deformable body 11 comprises a spongy material 15 and a sealed bag 16 containing, on the inside, the spongy material 15; when the sealed bag 16 is at atmospheric pressure, the spongy material 15 has its maximum size (shown in FIG. 6), whereas, when the sealed bag 16 is under vacuum, the pneumatic thrust of the atmospheric pressure acting upon the outer wall of the sealed bag 16 compresses the spongy material 15 to its minimum size (not shown).

According to a preferred (though, non-limiting) embodiment, the two actuator devices 9 share the pneumatic selector 13 and the vacuum source 12; namely, there are one single pneumatic selector 13 and one single vacuum source 12, which are common to both actuator devices 9 (which, hence, are always activated together and in the same way).

In the embodiment shown in the accompanying figures, only the front wheels 2 are steering wheels and, therefore, the two rear wheels 3 are not steering wheels; as a consequence, the two rear covering panels 7, which close the rear wheel compartments 6, are fixed (namely, are not movable), whereas the two front covering panels 8, which close the front wheel compartments 5, are movable between the contracted position and the expanded position. According to an alternative embodiment which is not shown herein, the rear wheels 3 are steering wheels as well (in addition to the front steering wheels 2); in this case, the two rear covering panels 7, which close the rear wheel compartments 6 can anyway be fixed (namely, non-movable), if the maximum steering angle of the rear wheels 3 is small, or they can be movable (similarly to the front covering panels 8) between the contracted position and the expanded position.

The embodiments described herein can be combined with one another, without for this reason going beyond the scope of protection of the invention.

The car 1 described above has numerous advantages.

First of all, the car 1 described above features a fairing of the front wheels 2 (which, hence, are screened by the front covering panels 8) to increase aerodynamic efficiency (namely, to reduce the drag coefficient).

Furthermore, the car 1 described above has a standard front axle track (namely, the distance between the outer sides of the front wheels 2), which is not affected by the presence of the front covering panels 8 screening the front wheels 2; this result is obtained thanks to the fact that the front covering panels 8 are movable between the contracted position and the expanded position, namely move outwards in order to allow the front wheels 2 to steer.

The front covering panels 8 (especially when they are made of fabric or the like) and the actuator devices 9 (especially when they use vacuum to generate the movement) have a very small overall weight.

Finally, the car 1 described above is easy and economic to be manufactured, since the front covering panels 8 (especially when they are made of fabric or the like) and the actuator devices 9 (especially when they use vacuum to generate the movement) have a relatively low cost.

LIST OF THE REFERENCE NUMBERS OF THE FIGS 1 car
2 front wheels
3 rear wheels
4 body
5 front wheel compartment
6 rear wheel compartment
7 rear covering panel
8 front covering panel
9 actuator devices
10 control unit
11 deformable body
12 vacuum source
13 pneumatic selector
14 duct
15 spongy material
16 sealed bag

The invention claimed is:

1. A car (1) comprising:
two front wheels (2);
two rear wheels (3);
a body (4), which has two front wheel compartments (5), each of which houses, on the inside, a corresponding front wheel (2), and two rear wheel compartments (6), each of which houses, on the inside, a corresponding rear wheel (3);
at least two covering panels (7, 8), each arranged in the area of a corresponding wheel compartment (5, 6) to close the wheel compartment (5, 6) and is mounted on the body (4) so as to be movable between a contracted position, in which the covering panel (7, 8) is completely flush with the body (4), and an expanded position, in which the covering panel (7, 8) is at least partially spaced apart from the body (4);
two actuator devices (9), each coupled to a corresponding covering panel (7, 8) so as to move the covering panel (7, 8) between the contracted position and the expanded position; and
a control unit (10) configured to detect a steering angle of the corresponding wheels (2, 3) and to move the covering panels (7, 8) between the contracted position and the expanded position depending on the steering angle of the corresponding wheels (2, 3);
wherein each actuator device (9) is a pneumatic device and comprises:
a deformable body (11), which expands, increasing its size, when it is subjected to the atmospheric pressure and contracts, reducing its size, when it is subjected to a vacuum;
a vacuum source (12), which is designed to generate a vacuum; and
a pneumatic selector (13), which is designed to alternatively connect the deformable body (11) to the vacuum source (12) or the atmospheric pressure,
wherein the control unit (10) is configured to move the covering panels (7, 8) from the contracted position to the expanded position when the steering angle of the corresponding wheels (2, 3) exceeds a first threshold value and to move the covering panels (7, 8) from the expanded position to the contracted position when the steering angle (2, 3) is smaller than the first threshold value.

2. The car (1) according to claim 1, wherein the first threshold value exceeds 2°.

3. The car (1) according to claim 1, wherein the control unit (10) is configured to keep the covering panels (7, 8) in the expanded position for a given amount of time after the steering angle of the corresponding wheels (2, 3) has exceeded the first threshold value, unless the longitudinal speed exceeds a second threshold value.

4. The car (1) according to claim 1, wherein each covering panel (7, 8) has a front portion, which is permanently connected to the body (4).

5. The car (1) according to claim 4, wherein each actuator device (9) is coupled to a rear portion of the corresponding covering panel (7, 8) and is designed to move the rear portion away from or close to the body (4).

6. The car (1) according to claim 1, wherein each covering panel (7, 8) is made of a deformable material.

7. The car (1) according to claim 6, wherein each covering panel (7, 8) is made of a textile material.

8. The car (1) according to claim 1, wherein each actuator device (9) normally is expanded so as to place the corresponding covering panel (7, 8) in the expanded position in the absence of a power supply.

9. The car (1) according to claim 1, wherein each deformable body (11) comprises:
a spongy material (15); and
a sealed bag (16), which contains, on the inside, the spongy material (15).

10. The car (1) according to claim 9, wherein, when the sealed bag (16) is at atmospheric pressure, the spongy material (15) has its maximum size, whereas, when the sealed bag (16) is under vacuum, the pneumatic thrust of the atmospheric pressure acting upon the outer wall of the sealed bag (16) compresses the spongy material (15) to its minimum size.

11. The car (1) according to claim 1, wherein the two actuator devices (9) share the pneumatic selector (13) and the vacuum source (12), so that there are one single pneumatic selector (13) and one single vacuum source (12), which are common to both actuator devices (9) and are always activated together and in the same way.

12. A car (1) comprising:

two front wheels (2);

two rear wheels (3);

a body (4), which has two front wheel compartments (5), each of which houses, on the inside, a corresponding front wheel (2), and two rear wheel compartments (6), each of which houses, on the inside, a corresponding rear wheel (3);

at least two covering panels (7, 8), each arranged in the area of a corresponding wheel compartment (5, 6) to close the wheel compartment (5, 6) and is mounted on the body (4) so as to be movable between a contracted position, in which the covering panel (7, 8) is completely flush with the body (4), and an expanded position, in which the covering panel (7, 8) is at least partially spaced apart from the body (4); and two actuator devices (9), each coupled to a corresponding covering panel (7, 8) so as to move the covering panel (7, 8) between the contracted position and the expanded position;

wherein each actuator device (9) is a pneumatic device and comprises: a deformable body (11), which expands, increasing its size, when it is subjected to the atmospheric pressure and contracts, reducing its size, when it is subjected to a vacuum; a vacuum source (12), which is designed to generate a vacuum; and a pneumatic selector (13), which is designed to alternatively connect the deformable body (11) to the vacuum source (12) or the atmospheric pressure;

wherein each actuator device (9) is coupled to a rear portion of the corresponding covering panel (7, 8) and is designed to move the rear portion away from or close to the body (4).

13. The car (1) according to claim 12, wherein each actuator device (9) is coupled to a rear portion of the corresponding covering panel (7, 8) and is designed to move the rear portion away from or close to the body (4).

14. The car (1) according to claim 12, wherein each actuator device (9) normally is expanded so as to place the corresponding covering panel (7, 8) in the expanded position in the absence of a power supply.

15. The car (1) according to claim 12, wherein each deformable body (11) comprises: a spongy material (15); and a sealed bag (16), which contains, on the inside, the spongy material (15).

16. The car (1) according to claim 15, wherein, when the sealed bag (16) is at atmospheric pressure, the spongy material (15) has its maximum size, whereas, when the sealed bag (16) is under vacuum, the pneumatic thrust of the atmospheric pressure acting upon the outer wall of the sealed bag (16) compresses the spongy material (15) to its minimum size.

17. A car (1) comprising:

two front wheels (2);

two rear wheels (3);

a body (4), which has two front wheel compartments (5), each of which houses, on the inside, a corresponding front wheel (2), and two rear wheel compartments (6), each of which houses, on the inside, a corresponding rear wheel (3);

at least two covering panels (7, 8), each arranged in the area of a corresponding wheel compartment (5, 6) to close the wheel compartment (5, 6) and is mounted on the body (4) so as to be movable between a contracted position, in which the covering panel (7, 8) is completely flush with the body (4), and an expanded position, in which the covering panel (7, 8) is at least partially spaced apart from the body (4); and two actuator devices (9), each coupled to a corresponding covering panel (7, 8) so as to move the covering panel (7, 8) between the contracted position and the expanded position;

wherein each actuator device (9) is a pneumatic device and comprises: a deformable body (11), which expands, increasing its size, when it is subjected to the atmospheric pressure and contracts, reducing its size, when it is subjected to a vacuum; a vacuum source (12), which is designed to generate a vacuum; and a pneumatic selector (13), which is designed to alternatively connect the deformable body (11) to the vacuum source (12) or the atmospheric pressure;

wherein each deformable body (11) comprises: a spongy material (15); and a sealed bag (16), which contains, on the inside, the spongy material (15).

18. The car (1) according to claim 17, wherein, when the sealed bag (16) is at atmospheric pressure, the spongy material (15) has its maximum size, whereas, when the sealed bag (16) is under vacuum, the pneumatic thrust of the atmospheric pressure acting upon the outer wall of the sealed bag (16) compresses the spongy material (15) to its minimum size.

19. The car (1) according to claim 17, wherein the two actuator devices (9) share the pneumatic selector (13) and the vacuum source (12), so that there are one single pneumatic selector (13) and one single vacuum source (12), which are common to both actuator devices (9) and are always activated together and in the same way.

* * * * *